Nov. 18, 1924.

A. L. MOTTLAU

DUPLEX TOASTER

Filed Sept. 29, 1920

1,516,054

2 Sheets-Sheet 1

Witnesses:
Chas. G. Whiteman
H. D. Penney

Inventor:
Alice Lee Mottlau,
By her Atty.
F. H. Richards

Nov. 18, 1924.

A. L. MOTTLAU 1,516,054

DUPLEX TOASTER

Filed Sept. 29, 1920     2 Sheets-Sheet 2

Witnesses:

Inventor:
Alice Lee Mottlau,
By her Atty,

Patented Nov. 18, 1924.

1,516,054

UNITED STATES PATENT OFFICE.

ALICE LEE MOTTLAU, OF FAR ROCKAWAY, NEW YORK.

DUPLEX TOASTER.

Application filed September 29, 1920. Serial No. 413,515.

*To all whom it may concern:*

Be it known that I, ALICE LEE MOTTLAU, a subject of the King of Denmark, residing in Far Rockaway, county of Queens, State of New York, have invented certain new and useful Improvements in Duplex Toasters, of which the following is a specification.

This invention relates to heating appliances, and particularly to electric appliances for toasting or heating bread, cereal flakes and other materials and for heating water or other liquids.

One object of the invention is to provide a device of this kind in which the material or article heated is heated simultaneously on both sides.

Another object is to provide a device for utilizing the high efficiency of parabolic or like reflectors for heating and cooking.

Another object is to provide novel containers or holders for use with devices as above described.

Another object is to provide a simple device of the above type which will be easily and efficiently operated, economically manufactured, sightly in appearance, and not liable to get out of order.

Another object of the invention is to provide a cooking and toasting device comprising double heating means spaced apart so that material while being heated is visible to the eye.

Other objects of the invention will appear as the description proceeds; and while herein minute details of the invention are described, the invention is not limited to these, since many and various changes may be made without departing from the scope of the invention as claimed.

Figure 1:
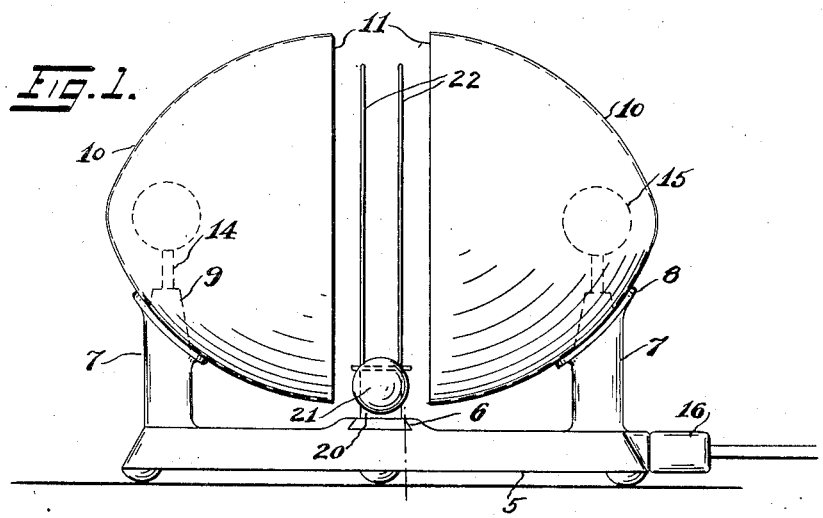

In the accompanying drawings showing by way of example three of many possible embodiments of the invention, Figure 1 is a front side elevation of the appliance.

Figure 2:
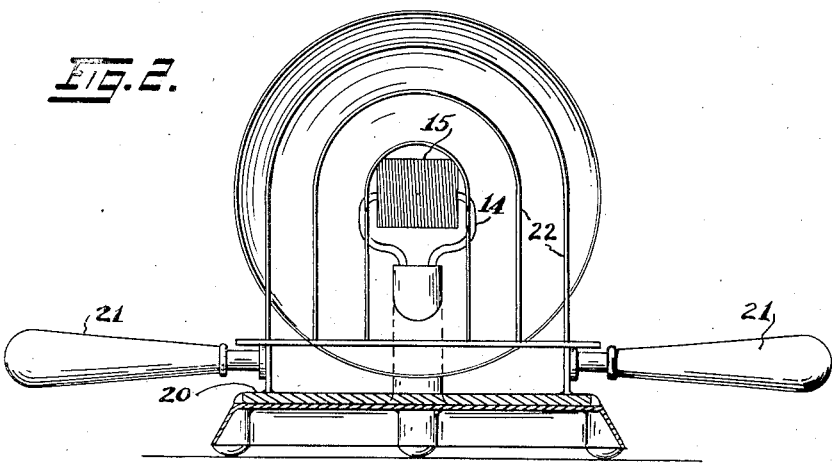
Figure 3:
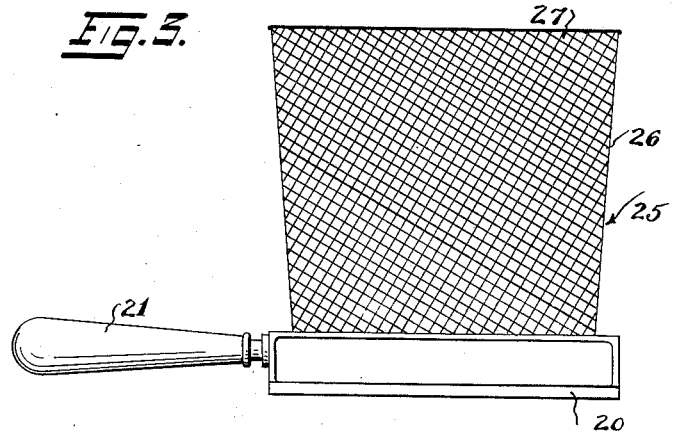
Figure 4:
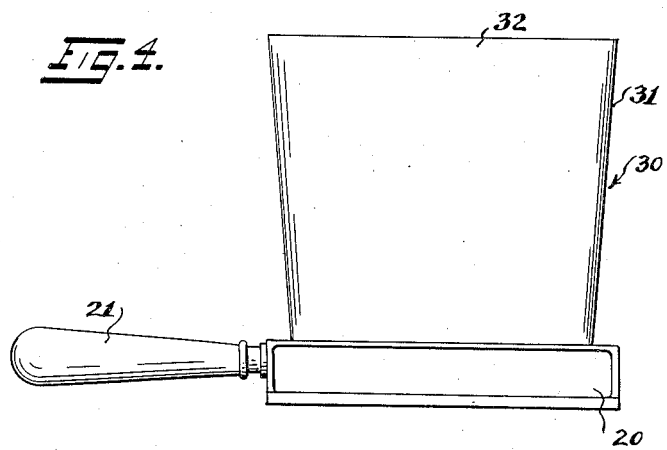

Fig. 2 is a central transverse sectional view showing a food holder in side elevation; and Figs. 3 and 4 are side elevations of other forms of holders or containers.

My improved appliance comprises an elongated base 5 having at the mid part a transverse open-ended under-cut seat 6 and at each end a bracket standard 7 having an intermediate curved seat flange 8 and an upstanding supporting upper end 9. A pair of substantially parabolic axially horizontal coaxial opposed heat reflectors 10 are mounted on said flanges 8 respectively and have their peripheries 11 spaced apart. An inverted U-shaped bracket 14 on each upstanding end 9 carries an electric heating unit or coil 15 placed on the yoke of the U-shaped bracket substantially in the focus of the reflector. A plug switch 16 is suitably electrically connected to said units.

A removable dove-tail support 20 slidable into and guided by said transverse seat 6 is provided with a handle 21 at each end and carries closely spaced upstanding side members 22 (Figs. 1 and 2) mounted on said support thereby to form a pair of racks between said reflectors, adapted to hold toast, meat or other articles or material in position to be heated on both sides simultaneously by heat rays from both of said reflectors and units.

Instead of said racks 22 there may be mounted on the dove-tail support 20 an upstanding wicker member 25 Fig. 3 having end walls 26 and closely spaced side walls 27 thereby to form a basket between said reflectors, adapted to hold cereal flakes or other material in position to be heated on both sides simultaneously by heat rays from both of said reflectors and units.

Instead of said bracket 22 or basket 25 there may be mounted on the dove-tail support 20 an upstanding imperforate member 30 Fig. 4 having solid end walls 31 and solid closely spaced side walls 32 thereby to form a vessel between said reflectors, adapted to hold water or other liquids or material in position to be heated on both sides simultaneously by heat rays from both of said reflectors and units.

While herein I show an appliance having two reflectors, rather than one or more, it is particularly stated, that the invention is not limited to the presence of a reflector or to any specific number thereof, nor is the device limited to electric appliances.

The operation of the device is simplicity itself. The article or material to be heated is placed between the racks 22, or in the wicker member or basket 25 or in the vessel depending upon the nature of the material. The support 20 is then slid in place either before or after the current has been turned on.

As the peripheries of the reflectors are spaced apart the toast or material is visible to the eye, while being heated, so that the toasting or heating may be stopped at exactly the right time.

The parabolic reflector with heating unit heats hottest along its axis, as the coil is closest to the toast at that point. Hence the parabolic reflector has the new function the toast is heated hottest at its intramarginal part and the toast is kept from burning at its edges.

As the seat 6 is open at both ends, any two of the holders may be used at the same time, as for instance when coffee and toast are to be kept warm.

Having thus described my invention, I claim:

1. An appliance comprising a base having a transverse seat; a bracket standard at each end of the base; a pair of opposed substantially parabolic reflectors mounted on said standards respectively and having their peripheries spaced apart; a heating unit placed on each standard substantially in the focus of the reflector; and a removable support slidable into said seat means on said support to hold material between said reflectors in position to be heated on both sides simultaneously by heat rays from both of said reflectors and units.

2. An apparatus comprising a base having a transverse open-ended under-cut seat; a bracket standard; on the base; a substantially parabolic axially horizontal heat reflector mounted on said standard; a heating coil placed on the standard substantially in the focus of the reflector; a removable support slidable into said transverse seat; and upstanding members mounted on said support thereby to form a means adapted to hold material closely adjacent to the plane of the periphery of the reflector in position to be heated by heat rays from both said reflector and said coil.

3. An electric appliance comprising an elongated base having at the mid part a transverse open-ended under-cut seat; a bracket standard at each end of the base and having an intermediate curved seat-flange and an upstanding supporting upper end; a pair of substantially parabolic axially horizontal co-axial opposed heat reflectors mounted on said standards respectively and having their respective peripheries spaced apart; an inverted U-shaped bracket on each upstanding end; an electric heating coil placed on the yoke of each U-shaped bracket substantially in the focus of the reflector; a plug switch suitable electrically connected to said units; a removable dove-tail support slidable into and guided by said transverse seat; a handle at one end of the support; and upstanding means mounted on said support to form a holding device between said reflectors adapted to hold material in position to be heated on both sides simultaneously by heat rays from both of said reflectors and units.

4. An appliance comprising a base having a seat; a pair of reflectors; a heating unit near each reflector; a removable support in said seat; a handle at one end of the support; and closely spaced upstanding side members mounted on said support thereby to form a pair of racks between said units adapted to hold toast, meat or other articles or material in position to be heated on both sides simultaneously by heat rays from both of said reflectors and units.

5. An appliance comprising a base; a pair of opposed parabolic reflectors fixed at each end of the base respectively and having their peripheries spaced apart; a heating unit fixed substantially in the focus of each reflector; and a removable support on said base and comprising means to hold toast or other material between said reflectors so that the material can be removed at either side of said base.

6. An appliance comprising a base; a pair of opposed parabolic reflectors at each end of the base respectively; a heating unit substantially in the focus of each reflector; and a removable support on said base and comprising means to hold toast or other material between said reflectors, the support being adapted to be removed at either side of said base.

7. An appliance comprising a pair of parabolic reflectors; means for holding material between said reflectors; and a heating unit between said material and each reflector, said reflectors being sufficiently spaced apart to permit view of said material.

8. An appliance comprising a base; a pair of opposed parabolic reflectors fixed at each end of the base respectively and having their peripheries spaced apart; a heating unit fixed substantially in the focus of each reflector; and a support on said base and comprising means to hold material between said reflectors; said peripheries being sufficiently spaced apart to permit view of the toast therebetween.

9. An appliance comprising, means for holding toast or other material; and a heating unit near said material; said appliance being constructed to permit view of the whole of the heated surfaces of said material during heat.

10. An appliance comprising, means for holding toast or other material; and a heating unit near said material; said appliance being constructed to permit a sufficient view of the most heated part of said material during heating to effectively judge the progress of the heating without moving the unit or material.

11. An appliance comprising, means for holding toast or other material; and a heating unit near said material; said appliance being constructed to permit unobstructed view of the middle part of the heated surface of said material during heating.

12. An appliance comprising, means for holding toast or other material; and a fixed heating unit near said material; said appliance being constructed to permit, without moving said means or unit, a sufficiently undimmed and unobstructed view of the heated part of said material during heating to effectively judge the progress of the heating.

13. An appliance comprising, a parabolic reflector; means for holding toast or other material near said reflector; and a heating unit between said material and the reflector, said reflectors being sufficiently spaced from said material to permit view of the heated side of said material during heating.

14. An appliance comprising a pair of fixed opposed reflectors; means for holding material or articles to be heated between said reflectors; and a heating unit between said material and each reflector; said reflectors being sufficiently spaced apart to permit, during heating, a sufficiently easy undimmed and unobstructed view of all of the heated portions of said articles or material to effectively judge the progress of the heating.

15. An appliance comprising a pair of fixed opposed coaxial concaved reflectors; means for holding material or articles to be heated between said reflectors; and a heating unit between said material and each reflector; said reflectors being sufficiently spaced apart to permit, during heating, an easy undimmed and unobstructed view of all of the heated portions of said articles or material.

16. An appliance comprising a deeply concaved reflector generated on a linear axis; a heating unit substantially in the focus of the reflector; and a support to hold material in the axis of said reflector far enough from said unit to be heated by an approximately even heat gradually diminishing away from said axis.

17. An appliance comprising a substantially parabolic reflector generated on a linear axis; a fixed heating unit substantially in the focus of the reflector; and a support to hold material near said reflector in the axis thereof.

18. An appliance comprising a support for holding toast or the like; a heating means constructed and positioned to direct its heat strongest at the center of said toast and gradually diminishing in all directions away from said center.

19. An appliance comprising a pair of opposed reflectors; a heating unit near the inner face of each reflector said reflectors and units co-operating to send direct and reflected rays more concentrated near the line joining the units and of gradually less concentration more remote all directions from the line; and a support to hold toast or other material between said reflectors with the toast substantially perpendicular and central to said line; said reflectors and units being sufficiently spaced from the toast to permit unobstructed view of the toast and judging of the progress of the toasting without moving the toast, units or reflectors.

20. An appliance comprising a pair of fixed opposed parabolic reflectors; means for holding material between said reflectors; and a heating unit between said material and each reflector.

21. An appliance comprising a base having a seat; a pair of fixed heating units; and means slidably engaged in said seat for holding material between said units.

22. An appliance comprising a base having a seat; a pair of fixed reflectors; means removable without tilting and slidably engaged in said seat for holding material between said reflectors; and a fixed heating unit between said material and each reflector.

23. An appliance comprising a reflector generated on a linear axis; a fixed heating unit substantially in the focus of the reflector; and a support to hold material near said reflector in the axis thereof.

24. An appliance comprising a concaved reflector generated on a linear axis; a heating unit substantially in the focus of the reflector; and a support to hold material in said axis far enough from said unit to be heated by an approximately even heat.

25. An appliance comprising a support adapted to hold toast; and means for directing against the side of said toast radiant heat more strongly at the middle part of said side and gradually evenly progressively less strongly away from said part.

26. An appliance comprising a support adapted to hold toast or material; and means for directing against both sides of said toast radiant heat more strongly at the middle part of said sides and gradually evenly progressively less strongly away from said part, whereby the toast is heated least at its marginal part.

27. An appliance comprising a pair of heating means; and a removable support adapted to hold toast or material between said means or to remove the toast from either side of the appliance; said appliance being provided with openings at both sides permitting the removal of said toast from either side of the appliance without raising the toast.

28. An appliance comprising a pair of heating means; and a removable support adapted to hold toast or material between said means or to remove the toast from either side of the appliance; said appliance being provided with openings at both sides permitting the removal of said support and toast from either side of the appliance without raising the support; and handles on opposite ends of said support whereby the support may be operated from either side of the appliance to remove said toast.

29. An appliance comprising a pair of heating means; and a removable support adapted to hold toast or material between said means or to remove the toast horizontally from either side of the appliance; said appliance being provided with openings at both sides permitting the horizontal removal of said toast from either side of the appliance.

30. An appliance comprising a pair of heating means; and a removable support horizontally removable from either side of the appliance and adapted to hold toast or material between said means; said appliance being provided with openings at both sides permitting the horizontal removal of said support and toast from either side of the appliance; and handles on opposite ends of said support whereby the support may be operated from either side of the appliance to remove said toast and support horizontally from either side.

31. An appliance comprising a pair of heating means; and a removable support adapted to hold toast or material between said means or to remove the toast from either side of the appliance by sliding movement; said appliance being provided with openings at both sides permitting the horizontal removal of said toast from either side of the appliance.

32. An appliance comprising a pair of heating means; and a removable support adapted to hold toast or material between said means or to remove the toast from either side of the appliance; said appliance being provided with openings at both sides permitting the horizontal slidable removal of said support and toast from either side of the appliance; and handles on opposite ends of said support whereby the support may be operated from either side of the appliance to remove said toast.

33. An appliance comprising a pair of heating means; and a removable support adapted to hold toast or material between said means or to remove the toast from either side of the appliance; said appliance being provided with unobstructed openings at both sides permitting the lateral removal of said toast from either side of the appliance without raising the toast.

34. An appliance comprising a pair of heating means; and a removable support adapted to hold toast or material between said means or to remove the toast horizontally from either side of the appliance; said appliance being provided with unobstructed openings at both sides permitting the horizontal removal of said support and toast from either side of the appliance without raising the toast; and handles on opposite ends of said support whereby the support may be operated from either side of the appliance to remove said toast.

35. An appliance comprising a seat; heating means on both sides of said seat; and a support disposable on and above said seat and adapted when resting on the seat to hold material above said seat and between said means.

36. An appliance comprising a seat; heating means at both sides of said seat; and a support disposable by movement from either side of the appliance to stand on said seat; and adapted to hold material between said means when resting on the seat.

37. An appliance comprising a seat; heating means at both sides of said seat; and a support disposable on said seat by substantially horizontal movement and adapted to hold material between said means when resting on the seat.

38. An appliance comprising an elongated seat; heating means at both sides of said seat; a support disposable on said seat by substantially horizontal movement and adapted to hold material above said seat and between said means when resting on the seat; and a handle on the end of the support and projecting from the appliance.

39. An appliance comprising an elongated seat having undercut shoulders at the respective sides; fixed heating means at both sides of said seat; and a support slidably disposable on said seat and under said shoulders by substantially horizontal movement from either end of the seat and adapted when resting on the seat to hold toast between said means.

40. An appliance comprising a radiant heating means; a concaved radiant reflector reflecting radiant heat rays from said means; and a support holding toast in position to receive on its side radiant heat rays from said means and reflector and in position to have said side viewed from above while receiving said rays.

41. An appliance comprising a radiant heating means; a concaved radiant reflector reflecting radiant heat rays from said means; and a support holding toast in position to receive directly on its side radiant heat rays direct from said means and reflector.

ALICE LEE MOTTLAU.